United States Patent

Hornby et al.

[11] Patent Number: 5,863,662
[45] Date of Patent: Jan. 26, 1999

[54] TERPOLYMER FOR INK JET RECORDING

[75] Inventors: John C. Hornby, Washington Township, N.J.; Domingo I. Jon, New York, N.Y.; Jenn S. Shih, Paramus, N.J.

[73] Assignee: ISP Investments Inc., Wilmington, Del.

[21] Appl. No.: 647,487

[22] Filed: May 14, 1996

[51] Int. Cl.$^6$ .......................... B32B 27/08; B32B 27/26; B32B 27/30; B32B 27/36

[52] U.S. Cl. .......................... 428/483; 428/195; 428/520; 428/522; 525/326.9; 525/329.9; 525/330.5; 526/263; 526/264; 526/318.4; 526/318.43; 526/318.5; 526/321

[58] Field of Search ...................... 428/480, 483, 428/500, 522, 195, 520; 525/57, 221, 225, 227, 426, 436, 451, 326.9, 329.9, 330.5, 326.8; 526/318.43, 316, 318.4, 318.5, 330, 310, 258, 263, 264, 265, 321, 317

[56] References Cited

U.S. PATENT DOCUMENTS

| | | | |
|---|---|---|---|
| 5,189,097 | 2/1993 | LaFleur et al. | 525/57 |
| 5,208,092 | 5/1993 | Iqbal | 428/195 |
| 5,665,835 | 9/1997 | Epple et al. | 526/185 |

*Primary Examiner*—Vivian Chen
*Attorney, Agent, or Firm*—Walter Katz; Marilyn J. Maue; William J. Davis

[57] ABSTRACT

A terpolymer for ink jet recording comprises by weight, 1–99% of a vinyl lactam, preferably vinyl pyrrolidone, 1–99% of a polymerizable carboxylic acid, preferably acrylic acid and 1–99% of 2-carboxyethyl (meth)acrylate, preferably crosslinked with a polyfunctional aziridine, This terpolymer forms water-insoluble coatings on a support such as paper or polyester which are particularly receptive to water-based ink jet printing inks.

5 Claims, No Drawings

TERPOLYMER FOR INK JET RECORDING

BACKGROUND OF THE INVENTION

1. Field of the Invention

This invention relates to polymers for ink jet recording, and, more particularly, to a terpolymer which is useful for ink-receptive layers for transparent and opaque imageable materials.

2. Description of the Prior Art

Iqbal et al., in U.S. Pat. Nos. 5,208,092 and 5,389,723, described a polymer matrix for ink jet recording which included a water soluble polymer crosslinked by polyfunctional aziridines. These crosslinked polymers were derived from the copolymerization of hydrophobic or hydrophilic ethylenically unsaturated monomers with monomers having acidic groups. A typical polymer matrix was made from vinylpyrrolidone, acrylic acid and N,N-dimethylacrylamide.

Accordingly, it is an object of this invention to provide a new and improved polymer matrix for ink jet recording which can afford waterfast images.

SUMMARY OF THE INVENTION

A polymer for ink jet recording comprises avinyl lactam, a polymerizable carboxylic acid, and 2-carboxyethyl (meth) acrylate. This terpolymer forms water-insoluble coatings when cross linked on a support such as paper or polyester which coatings are particularly receptive to ink jet printing.

DETAILED DESCRIPTION OF THE INVENTION

The terpolymer of the invention includes the following monomers; by weight, (a) 1–99%, preferably 40–90%, of a vinyl lactam, preferably vinyl pyrrolidone;

(b) 1–99%, preferably 5–40%, of an acrylic acid or methacrylic acid, preferably acrylic acid; and (c) 1–99%, preferably 5–40%, of 2-carboxyethyl (meth) acrylate.

In the terpolymer of the invention, component (c) has a carboxyl group which is attached to the polymer backbone through an ethylene group, whereas the carboxyl group of component (b) is attached directly to the polymer backbone. The presence of a pendant carboxyl group in the terpolymer herein enhances its crosslinkability, resulting in a matrix network which is receptive to a water-based ink.

The preferred crosslinking agent is a polyfunctional aziridine such as the following compounds:

(1) trimethylolpropane-tris-(β-(N-aziridinyl)propionate)

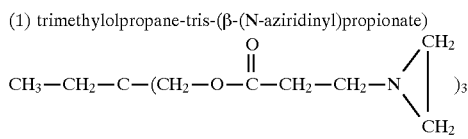

(2) pentaerythritol-tris-(β-(N-aziridinyl)propionate)

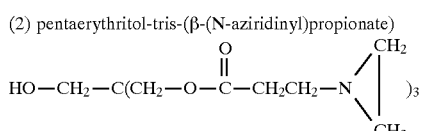

(3) trimethylolpropane-tris-(β-(N-methylaziridinyl propionate)

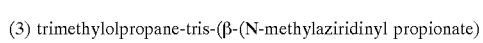

and the like, which have at least two crosslinking sites in each molecule.

The chemical name of aziridine is: 1-aziridinepropanoic acid, or 2-methyl-2-ethyl-2-[3-(2-methyl-1-aziridinyl)-1-oxopropoxylmethyl]1, 3-propandiyl ester; (Zeneca Resins, Wilmington, Mass., sold as CX-100).

The crosslinking agent typically comprises from about 0.1% to about 8% by weight of the composition for preparing the ink-receptive layer, more preferably from about 2% to about 3% by weight. At a level of below about 0.1% by weight, the crosslinking density is too low, adversely affecting both image quality and coating integrity. At a level above about 8% by weight, the crosslinking density is too high, resulting in low ink absorption.

The water-soluble terpolymer of the invention is typically formed by free radical, emulsion, or suspension polymerization techniques in an aqueous or an organic medium, preferably water. From about 0.01 to about 2.0% by weight (based on total weight of monomers) of a free radical initiator is typically employed. Polymerization can be carried out at a temperature of from about 25° C. to reflux temperature, depending on the initiator and the polymerization technique. In general, the terpolymer thus made can be mixed with an appropriate amount of polyfunctional aziridine crosslinking agent to form an aqueous coating solution, containing from about 5 to about 10% by weight solids. The solution then can be coated by conventional means, e.g., knife coating, rotogravure coating, reverse roll coating, or the like, onto a transparent support and dried at a temperature of about 200° F. for 3 to 4 minutes. Drying can be accomplished by means of heated air.

Crosslinking takes place during the drying process to form a transparent ink-receptive layer of a crosslinked polymeric network.

Solutions for forming the ink-receptive layer of the present invention can also contain certain additional modifying ingredients, such as adhesion promoters, particles, surfactants, viscosity modifiers, and like materials, provided that such additives do not adversely affect the ink-receptivity of the layer.

If preferred, an adhesion promoting priming layer can be interposed between the ink-receptive layer and the transparent support. Such an adhesion promoting layer can include chemical priming coatings and surface treatments, such as corona treatment. Adhesion of the ink-receptive layer can also be promoted by interposing between the priming layer and the ink-receptive layer a gelatin sublayer of the type used in photographic film backings. Film backings having both a priming layer and a gelatin sublayer are commercially available, and are frequently designated as primed and subbed film backings.

Recording sheets of the present invention particularly useful for ink-jet printing can have the ink-receptive layer thereof overcoated with an ink-permeable, anti-tack protective layer, such as, for example, a layer comprising poly (vinyl alcohol) in which starch particles have been dispersed. This overcoat layer can also provide surface properties to aid in properly controlling the spread of ink droplets to improve image quality.

In order to illustrate the various embodiments of the present invention, the following non-limiting examples are provided.

EXAMPLE 1

PREPARATION OF TERPOLYMER COMPOSITIONS OF INVENTION (UNCROSSLINKED)

1. Into a 1-liter, 4-necked resin kettle, fitted with an anchor agitator, a nitrogen purge adaptor, a thermometer, two subsurface feeding tubes connected with two feeding pumps, and a reflux condenser, charge: 500 g. of heptane.

2. Start nitrogen purging and continue throughout the run.

3. Agitate at about 200 rpm.

4. Heat the reactants from ambient temperature (20°–25° C.) to 65° C. in 20 minutes. Hold the temperature at 65° C. for 30 minutes.

5. Charge 260 microliters of t-butyl peroxypivalate (Lupersol® 11).

6. Charge 75 g. of vinylpyrrolidone (VP) and a mixture of 20 g. of acrylic acid (AA) and 10 g. of 2-carboxyethyl acrylate (CEA) into the reactor simultaneously over 4 hours and hold the temperature at 65° C.

7. Hold the reaction mixture at 65°C. for one hour and transfer the solution into 2-liter stainless steel high pressure reactor.

8. Charge 1.0 g. of Lupersol® 101.

9. Purge with nitrogen to 30 psi and vent to 2 psi. Repeat three times and heat the reactor to 130° C.

10. Hold the reaction mixture at 130° C. for 8 hours.

11. Cool the reactor to room temperature; transfer to a flat container.

12. Dry the wet cake in a vacuum oven at 95° C. for 16 hours.

EXAMPLES 2 AND 3

The procedure of Example 1 was repeated with different amounts of the components of the terpolymer to provide the terpolymer compositions given below.

TABLE I

SUMMARY OF EXAMPLES 1–3

| | | Wt. % | | |
|---|---|---|---|---|
| Ex. No. | Composition | VP | AA | CEA |
| 1 | A | 75 | 20 | 10 |
| 2 | B | 75 | 15 | 20 |
| 3 | C | 75 | 23 | 5 |

EXAMPLE 4

(Crosslinked Polymer polymer of Composition A)

25 g of A was thoroughly mixed with 0.093 g of CX-100. The formulation was coated, dried, imaged, immersed in distilled water and rubbed. The polymer layer remained intact.

EXAMPLE 5

(Uncrosslinked Polymer of Composition C)

17.7 g of P(VP/AA/CEA( (75/23/5) was predissolved in 22.5 g of isopropanol, 22.5 g of distilled water and 6.7 g of ammonia, and was further diluted with 16.2 g of isopropanol and 16.2 g of distilled water. The final pH of the solution was 9.8. The formulation was treated as in Example 1. The film become completely detached from the substrate upon light rubbing.

EXAMPLE 6

(Crosslinked Polymer of Composition C)

25 g of the polymer solution of Example 5 was thoroughly mixed with 0.091 g of CX-100. The formulation was treated as above. The polymer layer remained intact with light rubbing.

EXAMPLE 7

(Uncrosslinked Polymer of Composition C)

11.1 g of the predissolved P(VP/AA/CEA) (75/23/5) polymer was mixed with 17.8 g of 8.5% polyvinylalcohol (dissolved in a 1:1 isopropanol:distilled water), 10.6 g of isopropanol, and 10.6 g of distilled water. The final pH of the solution was 9.6. The formulation was treated as above. The polymer layer remained intact with light rubbing. Rubbing with moderate pressure led to detachment of the film from the substrate.

EXAMPLE 8

(Crosslinked Polymer of Example 7)

25 g of Example 7 was thoroughly mixed with 0.052 g. of CX-100. The formulation was treated as above. The polymer layer remained intact with light rubbing. Increased pressure in rubbing did not lead to detachment of the film from the substrate.

EXAMPLE 9

(Uncrosslinked Polymer of Composition A)

17.8 g of the predissolved P(VP/AA/CEA) (75/20/10) (A) was further diluted with 16.1 g of isopropanol and 16.1 g of distilled water. The final pH of the solution was 9.8. The formulation was treated as previously. The film was completely detached from the substrate with light rubbing.

EXAMPLE 10

25 g of Example 9 was thoroughly mixed with 0.089 g of CX-100. The formulation was treated as above. The polymer layer remained intact with light rubbing.

EXAMPLE 11

17.8 g of the predissolved P(VP/AA/CEA) (75/20/10) (A) was mixed with 0.28 g of Igepal CO-630, 16 g of isopropanol and 16 g of distilled water. The final pH of the solution was 9.4. The formulation was coated as above. The film was completely detached from the substrate with light rubbing.

EXAMPLE 12

25 g of Example 11 was thoroughly mixed with 0.082 g of CX-100. The formulation was coated as above. The polymer layer remained intact with light rubbing.

EXAMPLE 13

17.8 g of the predissolved P(VP/AA/CEA) (75/15/20) (B) was further diluted with 16.1 g of isopropanol and 16.1 g of distilled water. The final pH of the solution was 9.8. The formulation was coated as above. The imaged film was then immersed in distilled water for 3 minutes after which it was rubbed with the fingers. The film was completely detached from the substrate with light rubbing.

EXAMPLE 14

25 g of Example 13 was thoroughly mixed with 0.093 g of CX-100. The formulation was treated as above. The imaged film was then immersed in distilled water for 3 minutes after which it was rubbed. The polymer layer remained with light rubbing intact.

EXAMPLE 15

11.1 g of predissolved P(VP/AA/CEA) (75/15/20) (B) was mixed with 17.8 g of 8.5% polyvinylalcohol (PVA) (dissolved in a 1:1 isopropanol:distilled water), 10.6 g of isopropanol, and 10.6 g of distilled water. The final pH of the solution was 9.6. The formulation was coated onto polyester film as above. The imaged film was immersed in distilled water for 3 minutes after which it was rubbed lightly. The polymer layer remained intact because of hydrogen bonding between PVA and PVP, which forms a less hydrophilic polymer complex resulting in a less water sensitive coating.

EXAMPLE 16

25 g of Example 15 was thoroughly mixed with 0.053 g of CX-100. The imaged film was then immersed in distilled water for 3 minutes after which it was rubbed lightly. The polymer layer remains intact with light rubbing.

EXAMPLE 17

The procedures of Examples 1–16 were followed using different weight ratios of the terpolymer components within the range 1–99% vinylpyrrolidone, 1–99% acrylic acid and methacrylic acid and 1–99% 2-carboxyethyl acrylate or 2-carboxyethyl methacrylate, with similar results.

While the invention has been described with particular reference to certain embodiments thereof, it will be understood that changes and modifications may be made which are within the skill of the art. Accordingly, it is intended to be bound only by the following claims, in which:

What is claimed is:

1. A recording sheet comprising a support bearing on at least one surface thereof a transparent ink-receptive layer comprising
   (a) about 92 to 99.9% by weight of a terpolymer which comprises, by weight, based on the terpolymer, 1–99% of a vinyl lactam, 1–99% of a polymerizable carboxylic acid and 1–99% of 2-carboxyethyl acrylate or 2-carboxyethyl methacrylate; and
   (b) about 0.1 to 8% by weight of the terpolymer of a polyfunctional aziridine crosslinking agent; said terpolymer having been crosslinked after being coated onto said support.

2. A recording sheet according to claim 1 wherein the terpolymer components are present in weight amounts of 40–90%, 5–40% and 5–40%, respectively.

3. A recording sheet according to claim 1 which is overcoated with poly(vinylalcohol).

4. A recording sheet according to claim 1 wherein the vinyl lactam is vinylpyrrolidone and the polymerizable carboxylic acid is acrylic acid or methacrylic acid.

5. The recording sheet of claim 1 wherein said support is a polyester film or paper.

* * * * *